United States Patent
Kerpez et al.

(10) Patent No.: US 9,860,111 B2
(45) Date of Patent: Jan. 2, 2018

(54) METHOD AND APPARATUS FOR DIAGNOSING AND CONFIGURING A BROADBAND CONNECTION VIA AN ALTERNATE COMMUNICATION PATH

(71) Applicant: ADAPTIVE SPECTRUM AND SIGNAL ALIGNMENT, INC., Redwood City, CA (US)

(72) Inventors: Kenneth J. Kerpez, Long Valley, NJ (US); Stefano Galli, New York, NY (US); George Ginis, San Mateo, CA (US); Marc Goldburg, Redwood City, CA (US); Peter J. Silverman, Evanston, IL (US); Mehdi Mohseni, Menlo Park, CA (US)

(*) Notice: Subject to any disclaimer, the term of this patent is extended or adjusted under 35 U.S.C. 154(b) by 56 days.

(21) Appl. No.: 15/034,856

(22) PCT Filed: Nov. 7, 2013

(86) PCT No.: PCT/US2013/068943
§ 371 (c)(1),
(2) Date: May 5, 2016

(87) PCT Pub. No.: WO2015/069262
PCT Pub. Date: May 14, 2015

(65) Prior Publication Data
US 2016/0285676 A1    Sep. 29, 2016

(51) Int. Cl.
*H04L 12/24* (2006.01)
*H04M 3/30* (2006.01)
(Continued)

(52) U.S. Cl.
CPC ...... *H04L 41/0654* (2013.01); *H04L 41/0663* (2013.01); *H04L 41/0672* (2013.01);
(Continued)

(58) Field of Classification Search
None
See application file for complete search history.

(56) References Cited

U.S. PATENT DOCUMENTS 7,522,904 B1 * 4/2009 Zhu .................... H04L 12/2898
                                                      370/338
9,130,766 B2 * 9/2015 Phuah ................ H04L 12/2697
(Continued)

FOREIGN PATENT DOCUMENTS

WO        2013085486        6/2013

OTHER PUBLICATIONS

International Search Report and Written Opinion dated Jul. 14, 2014, for PCT Application No. PCT/US13/68943.

*Primary Examiner* — Hong Cho
(74) *Attorney, Agent, or Firm* — North Weber & Baugh LLP (57) ABSTRACT

An alternate communications device is coupled to a broadband CPE in broadband customer premises equipment (CPE). The broadband CPE is coupled to a broadband communication network management device via a primary communication path. The alternate communications device is further coupled to the broadband communication network management device via an alternate communication path. The alternate communications device is to provide diagnostic and configuration information about a broadband connection to the broadband communication network management device via the alternate communication path when the broadband CPE is unable to provide such via the broadband connection. The broadband communication network management device is to perform analysis on this information. The alternate communications device is to receive from the broadband communication network management device, via the alternate communication path, new diagnostic information and new configuration information about the broadband
(Continued)

connection responsive to the broadband communication network management device performing the analysis.

26 Claims, 4 Drawing Sheets

(51) Int. Cl.
*H04M 11/06* (2006.01)
*H04L 12/26* (2006.01)

(52) U.S. Cl.
CPC ......... *H04M 3/304* (2013.01); *H04M 11/062* (2013.01); *H04L 41/5074* (2013.01); *H04L 43/0811* (2013.01); *H04L 43/0817* (2013.01)

(56) References Cited

U.S. PATENT DOCUMENTS

| | | | |
|---|---|---|---|
| 2004/0165533 A1* | 8/2004 | Izundu | H04L 41/0654 370/241 |
| 2010/0131799 A1* | 5/2010 | Wu | H04L 41/0663 714/26 |
| 2011/0228665 A1 | 9/2011 | Shiv et al. | |

* cited by examiner

METHOD AND APPARATUS FOR DIAGNOSING AND CONFIGURING A BROADBAND CONNECTION VIA AN ALTERNATE COMMUNICATION PATH

CLAIM OF PRIORITY

This United States Patent Application, filed under 35 U.S.C. §371, claims priority to, International Patent Application No. PCT/US13/68943 entitled "METHOD AND APPARATUS FOR DIAGNOSING AND CONFIGURING A BROADBAND CONNECTION VIA AN ALTERNATE COMMUNICATION PATH," filed 7 Nov. 2013, the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relate to broadband access diagnostics and configuration. In particular, embodiments of the invention relate to utilizing an alternate communications device at the customer premises equipment (CPE) end of a broadband communications network to communicate diagnostics and configuration information regarding a broadband communications network to a broadband communications network management device, via an alternate communications path, wherein the management device analyzes the information and provides new information responsive to the analysis to the alternate communications device via the alternative communications path.

BACKGROUND

"Last mile" broadband service can be effectively diagnosed remotely, end-to-end, if the broadband line is up and connected. Data can be remotely retrieved from the customer modem or gateway or other communicable customer premises equipment (CPE) via various protocols. Data can also be retrieved from the network equipment terminating at the network-end of the broadband connection, including: the Digital Subscriber Line Access Multiplexer (DSLAM), Optical Line Termination (OLT), Cable-modem termination system (CMTS), Multi-Service Access Node (MSAN), or Access Node (AN). Since the broadband line is up and running, many details about the line conditions, performance, channel, noise, etc., can be retrieved remotely and automatically from the CPE.

Broadband services that are disconnected are more difficult to diagnose remotely or automatically. Here, disconnected generally means that the broadband line is incapable of data communications, so it does not provide data connectivity between the customer's premises and the diagnostic equipment in the broadband network. A single-ended line test (SELT) or metallic line test (MELT) can perform some electrical tests from the network end of a disconnected DSL line, and an Optical Time-Domain Reflectometry (TDR) test can be performed from the network end of an optical fiber. However, data about the customer premises' end of the broadband line can only be manually retrieved, typically by the customer calling in a trouble report over a telephone and then by dispatching a technician to the customer's premises. Repair or remediation of disconnected broadband services is usually manual, either by the broadband service provider's technicians or by the customer. The customer may be guided by generally available self-help information, or by communicating with a customer service representative (CSR) over the phone or via messaging. A technician dispatched to the customer's site uses portable test equipment and their own expertise to diagnose the problem with the connection and to effectuate a manual repair, which may be costly for the service provider.

What is needed is a way to address the situation that occurs when a broadband communications service is inoperable or unstable so that is not possible to transport diagnostic and configuration information between the customer-premises equipment (CPE) for the service and a broadband network management device that performs automated diagnostic and reconfiguration across the broadband service.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Embodiments of the invention relate to a system and method that exploits a redundant signaling path for aiding with broadband access diagnostics and configurations. Embodiments of the invention address the case when a broadband line service is inoperable or so unstable that is not possible to transport diagnostic and configuration information between the customer-premises equipment (CPE) for that service and a broadband network management device (one or more servers, or in a cloud computing environment) that performs automated diagnostics and configurations across the broadband service. In one embodiment, the broadband CPE provides diagnostics information to an alternate communication device that can establish a connection with the broadband communications network management device through an alternate communication path. The diagnostic data is then used by the management device to automatically diagnose one or more of the broadband service, the customer-premises network, WiFi, CPE or other devices, and to perform through the alternate communication path automatic device re-configuration, generation of targeted guidance for remediation, or other actions necessary to re-establish the connectivity and performance of the wired broadband access connection.

Various aspects of embodiments of the invention relate to automated data retrieval; automated analysis using one or more of the data retrieved through the alternate communication path, historical data, and data from related or connected broadband systems; data distillation and analyses providing diagnosis of degradations on the broadband connection and automatic remote re-configuration, automated trouble ticket generation, or case-by case guidance for remediation of the degraded connection.

Embodiments of the invention are primarily targeted for use with wireline broadband. This includes Passive Optical Networks (PON), point-to-point fiber broadband, active Ethernet broadband, cable broadband using Data Over Cable Service Interface Specifications (DOCSIS); and Digital Subscriber Lines (DSL).

As used herein, the term "DSL" refers to any of a variety and/or variant of DSL technology such as, for example, Asymmetric DSL (ADSL), ADSL2, ADSL2plus, Highspeed DSL (HDSL), HDSL2, Symmetric DSL (SDSL), SHDSL, Very high-speed/Very high-bit-rate DSL (VDSL), VDSL2, vectored VDSL2, and/or G.fast. Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission, I.T.U. standard G.994.1 (G.hs) for modems implementing handshake, and/or the I.T.U. G.997.1 (a.k.a. G.ploam) standard for management of DSL modems. The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration, fault and performance management. In performing the disclosed functions, systems may utilize a variety of operational data (which includes performance data) that is available at an Access Node (AN).

Figure 1:
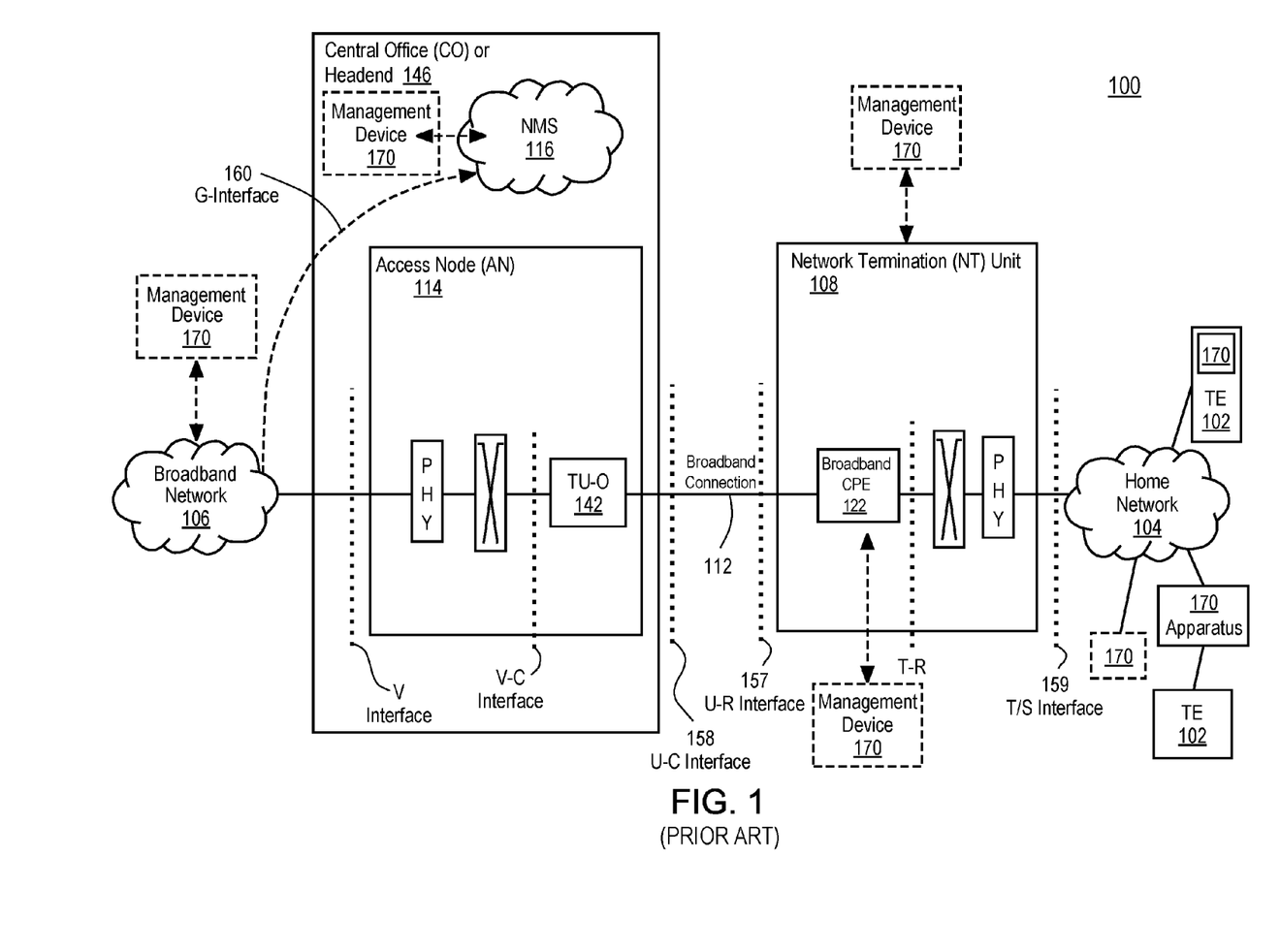
FIG. 1 illustrates an exemplary architecture in which embodiments of the invention may operate.

FIG. 1 illustrates an exemplary architecture 100 in which embodiments may operate in compliance with the foregoing standards. In FIG. 1, user's terminal equipment 102 (e.g., a Customer Premises Equipment (CPE) device or a computer, network node, LAN device, etc.) is coupled to a home network 104, which in turn is coupled to a Network Termination (NT) Unit 108. Multiple TU devices ("all Transceiver Unit" devices) are further depicted. A TU provides modulation for a broadband connection, loop or line. In one embodiment, NT unit 114 includes a broadband CPE, modem or gateway 122.

In one embodiment, broadband CPE 122 collects and stores, among other things, operational data in its Management Information Base (MIB), which is a database of information capable of being accessed via network management protocols such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; via embedded operations channel (eoc) signaling over a DSL line, via a TR-69 based protocol, via ITU-T G.984.4 and G.988 ONU management and control interface (OMCI) signaling, via DOCSIS management signaling, via the Open Cable Application Platform (OCAP), via Ethernet OAM signaling, via extended OAM for Ethernet PON (EPON) using SIEPON, via web-services interfaces, via a web-browser interface, or via a command line interface (CLI). "TR-69" or "Technical Report 069" is in reference to a DSL Forum technical specification entitled CPE WAN Management Protocol (CWMP) that defines an application layer protocol for remote management of end-user devices. XML or "eXtended Markup Language" compliant programming and interface tools may also be used.

In one embodiment, Network Termination Unit 108 is communicably interfaced with a management device 170 as described herein. In another embodiment, modem or gateway 122 is communicably interfaced with management device 170. Each modem 122 in a system may be coupled with a transmission unit (TU-O) in a Central Office (CO), headend, or other central location. The TU-O 142 is located at an Access Node (AN) 114 in Central Office or headend 146. A Management Device 170 likewise maintains an MIB of operational data pertaining to TU-O 142. The Access Node 114 may be coupled to a broadband network 106 or other wide-area network (WAN), as will be appreciated by those skilled in the art. Each of modem 122 and TU-O 142 are coupled together by a broadband connection 112, which in the case of DSL may be a twisted pair line, such as a telephone line, which may carry other communication services besides DSL based communications. The broadband connection may also be a point-to-point fiber, a passive optical network (PON), a cable TV network, a hybrid fiber-coax (HFC) network, a fixed wireless network, or a power-line carrier (PLC) network.

Management device 170 may be managed or operated by a service provider of the broadband services or may be operated by a third party, separate from the entity which provides broadband services to end-users. Thus, in accordance with one embodiment apparatus 170 is operated and managed by an entity that is separate and distinct from a telecommunications operator responsible for a plurality of digital communication lines.

Several of the interfaces shown in FIG. 1 are used for determining and collecting operational data. The Q interface 126 provides the interface between the Network Management System (NMS) 116 of the operator and Access Node 114. v Depicted within FIG. 1 is management device 170 operating at various optional locations in accordance with several alternative embodiments. For example, management device 170 is located at central office or headend 146 and interfaced to home network 104 (e.g., a LAN) and broadband network 106 (e.g., WAN). In another embodiment, management device 170 operates on the broadband network 106 (e.g., on the WAN). In yet another embodiment, apparatus 170 operates as a remote server, servers, or cloud computing infrastructure.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. Example customer premises include a residence or an office building. As used herein, the term "service provider" refers to any of a variety of entities that provide, sell, provision, troubleshoot and/or maintain communication services and/or communication equipment. Example service providers include a telephone operating company, a cable operating company, a wireless operating company, an Internet service provider, a competitive operator, or any service that may independently or in conjunction with a broadband communications service provider offer services that diagnose or improve broadband communications services (DSL, DSL services, cable, fiber, etc.).

Figure 2:
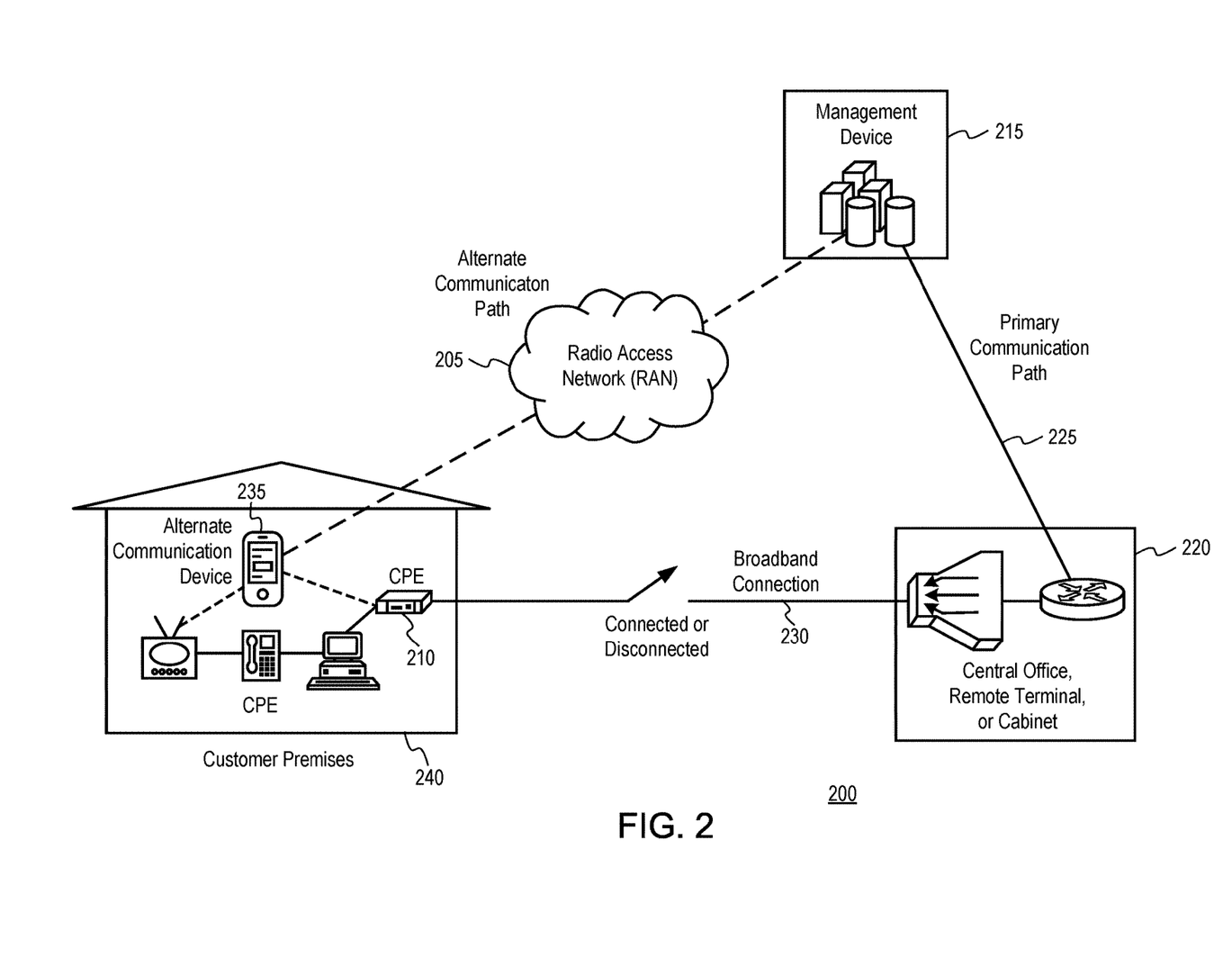
FIG. 2 illustrates an embodiment of the invention.

FIG. 2 illustrates an embodiment of the invention at 200. The customer premises equipment (CPE) 210 includes the broadband CPE, modem, or gateway 122 that terminates the broadband connection 230, as well as smartphones 235, other wireless customer-premises devices, and networked telephones and consumer electronics (CE) devices. If the broadband connection is connected, with data connectivity, then data can flow from the CPE 210, located in the customer premises 240, across the broadband connection 230 and across the "normal" or "primary" communication path 225 to the broadband communication network management device (hereinafter simply "management device") 215. If the broadband connection 230 is disconnected, then data can flow from the CPE 210 to the management device 215 via an alternate communication path 205. This alternate communication path could be established through an alternate communication device 235 such as a smart phone as shown in FIG. 2. In one embodiment, the alternate communication path is the radio access network (RAN). The "disconnected" broadband connection 230 does not have data connectivity; this may be due to a physical cable break, electrical impairments, malfunctioning equipment, misconfiguration, or other fault condition.

Figure 3:
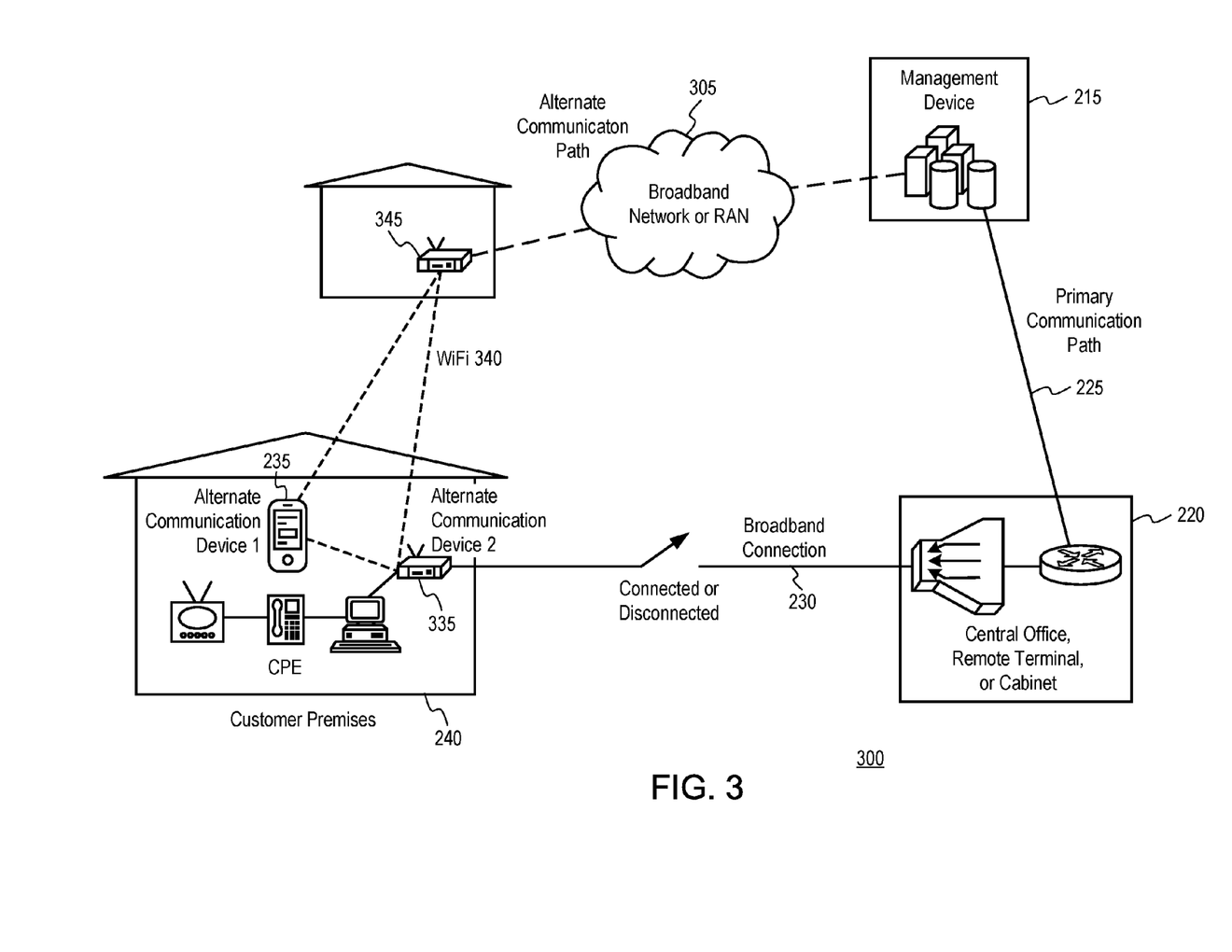
FIG. 3 illustrates an embodiment of the invention.

FIG. 3 illustrates an embodiment of the invention that is similar to the embodiment illustrated in FIG. 2, except that the alternate communication device 235, e.g., a smartphone, or the CPE, connect across an alternate communication path implemented as a WiFi connection 340 which in turn is bridged at a wireless access point 345 to an active neighboring broadband service, illustrated at 305.

Figure 4:
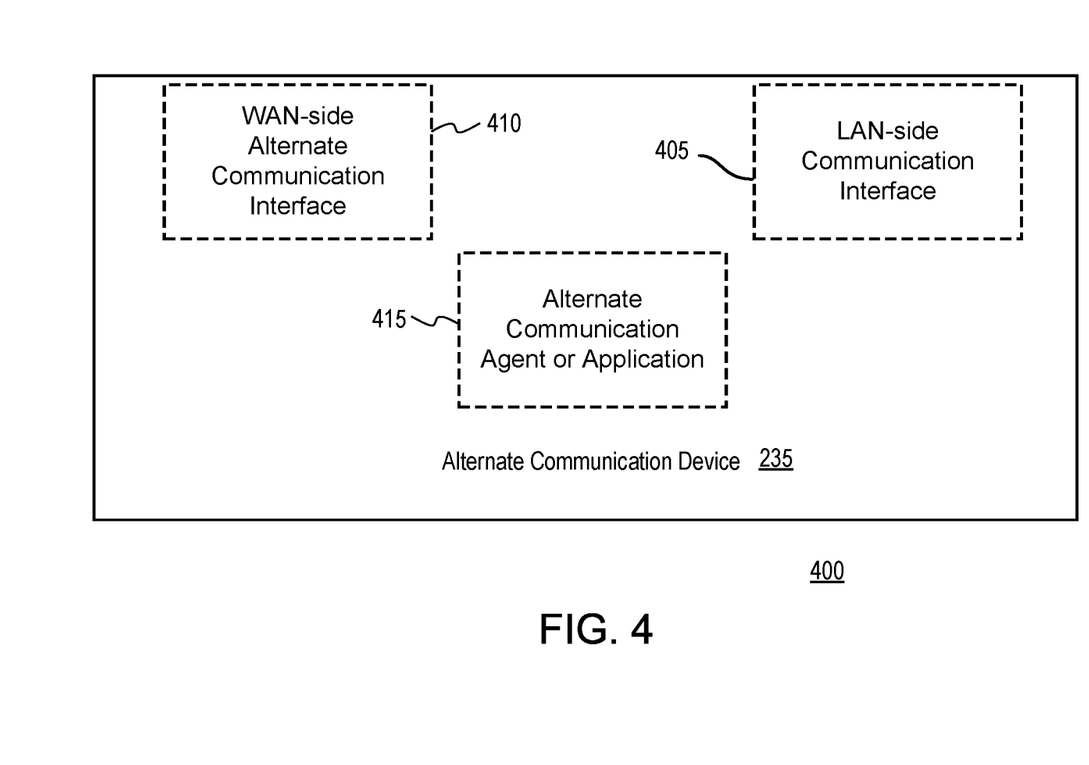
FIG. 4 illustrates an embodiment of the invention.

FIG. 4 illustrates an embodiment of the invention in which the functions of the alternate communication device 235 are implemented in interfaces 405 and 410, and an agent 415. In particular, a WAN-side alternate communication interface 410 provides a means for communicatively coupling the alternate communications device over the alternate communication path to the management device 215. A LAN-side communication interface 405 provides a means for the alternate communications device 235 to communicate with the customer premises network, devices coupled to the customer premises network, and the broadband CPE, including the modem or gateway that normally terminates the broadband connection 230.

Embodiments of the invention offer a solution for diagnosis and remediation of disconnected broadband services. The alternate communication device 235 contains a software agent 415 or application as well as one or more WAN-side alternate communication interfaces 410 and one or more LAN-side customer-premises network interfaces 405. The alternate communication device has the capability to access and relay, to remote management systems, such as management device 215, diagnostic information regarding the broadband connection 230 maintained on the broadband modem or gateway at 210 or another CPE. The alternate communications device can also send and relay, from remote management systems, messages to the CPE 210 to reconfigure the CPE's broadband connection or to run diagnostic tests on the CPE or the broadband connection, for example to run single-ended line test (SELT) from the CPE. The alternate communication device and associated software can also gather information from these tests and send this data to a management device 215. As illustrated in FIGS. 2 and 3, the alternate communication device communicates with the management device that is remote from the customer's premises 240 over an alternate communications path, such as a Radio Access Network (RAN) 205. This relays the collected test, diagnostics, status, performance, monitoring, inventory, and configuration data from the CPE 210 to the management device 215.

Communications from the CPE across the alternate communication path 205 to the management device 215 can be coordinated by a software application 415 on the alternate communication device 235. The alternate communication device may relay raw data collected from the CPE without change. Or, the software application on the alternate communication device may process the data collected from the customer premises to produce a digest before relaying it. The management device receives this data, distills and analyzes this data, and can automatically reconfigure the broadband connection or CPE devices, or provide guidance to help a user at the customer premises enable broadband service restoration. In one embodiment, the CPE, or the network equipment, or both, can be re-configured.

Embodiments of the invention allow for real-time bi-directional exchange of data between the customer premises 240 and the management device 215, even when the broadband connection 230 is disconnected, by establishing a bi-directional link from the customer premises to the management device via the alternate communication path 205. Embodiments of the invention can be instantiated by software installed on customer devices and management servers.

According to one embodiment of the invention, the embodiment can enable or assist with customer self-install (CSI), e.g., for VDSL or super-fast broadband. Self-install can result in malfunctioning lines which can then benefit from the described embodiments.

The following description provides details of the components of embodiments of the invention.

Alternate Communication Device

The alternate communication device 235 allows devices in the customer premises to exchange data with a management device 215 located in the broadband network outside the customer premises. The alternative communication device 235 may be implemented in or by a smartphone, modem, residential gateway, WiFi access point (AP, including a WiFi "hotspot" on a smartphone), or other device. The alternative communication device 235 may also be implemented in or by a computer or tablet with communications interfaces. For example, the alternative communication device may be a Smart Phone (for example an iPhone, a Android, a Microsoft Windows phone, a Blackberry, Firefox, Palm, Symbian, etc.), a tablet computer, a personal computer (PC), customer premises equipment (CPE), residential gateway, modem, or consumer electronics device (CE).

The alternate communication device 235 facilitates communication across the alternate communication path 205. The alternate communication device has a WAN-side alternate communication interface 410, a LAN-side communication interface 405, and, optionally, an alternate communication agent or application 415. The alternate communication device itself can also locally and optionally perform some data distillation, management functions, and other functions elsewhere ascribed to, or in support of, the management device.

In various embodiments of the invention, the alternate communication device comprises one or more of:
a cellular telephony compatible device;
a third generation (3G) compatible device;
a fourth generation (4G) compatible device;
a Long Term Evolution (LTE) compatible device;

a WiFi access point, including without limitation a WiFi access point implemented on a smartphone;
a WiFi compatible device;
a modem;
a router;
a gateway;
a Digital Subscriber Line (DSL) Customer Premises Equipment (CPE) modem;
A Passive Optical Network (PON) Optical Network Unit (ONU);
A cable modem;
A Data Over Cable Service Interface Specifications (DOCSIS) compatible device;
an in-home power line device;
an access power-line carrier (PLC) modem;
a Home Phoneline Network Alliance (HPNA) based device;
an in-home coax distribution device;
a G.hn compatible device;
an in-home metering communication device;
an in-home appliance communicatively interfaced with the LAN;
a wireless femtocell base station;
a wireless compatible base station;
a wireless mobile device repeater;
a wireless mobile device base station;
an Ethernet gateway;
a computing device connected to the LAN;
a HomePlug device;
an IEEE P1901 standards compatible access Broadband over Power Line (BPL) device;
an IEEE 1394 standards compatible device;
an Ethernet connected computer peripheral device;
an Ethernet connected router;
an Ethernet connected wireless bridge;
an Ethernet connected network bridge; and
an Ethernet connected network switch.

Alternate Communication Device Agent or Application

An agent, application, app, firmware, or software 415 is optionally installed on the alternate communication device 235, in an embodiment of the invention. The alternate communication device is a function, and may also be physically installed on or distributed across other networked or communicable devices including the broadband CPE 210 in the customer premises 240. The agent can facilitate the monitoring and diagnostics of customer-premises networked devices including troubleshooting a faulty or poorly performing broadband access connection 230. The agent 415 can initiate, terminate, and coordinate communications sessions between the alternate communication path 235, the broadband CPE 210, and other customer-premises networked devices.

The alternate communication application functions include one or more of:

Communications between the alternate communication device and the CPE 210, typically, but not necessarily, using management interfaces;

Coordination, initiation, and termination of communications sessions between the alternate communication path 235, the broadband CPE 210, and other customer-premises networked devices.

Connection to a remotely located management device 215 over the alternate communication path 235;

The ability to relay management messages sent between the management device 215 and the CPE 210 between the alternate communication path 235 and the LAN interface 405, these messages may use any management protocol including those listed herein.

Digesting the management information collected from the CPE or sent from the management device before relaying it between the CPE and the management device;

The ability to accept input data from the user at the customer premises 240;

The ability to accept input data or instructions from the management device 215;

The ability to issue management requests to the CPE 210, including without limitation that the CPE be placed in special diagnostic modes or to run diagnostic tests on the CPE itself or on the line 230 connecting the CPE to the broadband network;

Processing and analyses of data and line conditions for trouble shooting to identify the root cause of troubles or methods of improving broadband performance;

The ability to provide information to the user, including without limitation to provide targeted instructions for remediation; and Re-configuration of the CPE, including changing communications configuration parameters.

The alternate communication device application may also include functionality associated with the management device as described below.

The alternate communication device application can also provide more sophisticated functionalities such as processing diagnostics and configuration data received from the CPE 210 or management device 215.

WAN-Side Alternate Communication Device Interface

The WAN-side alternate communication device interface 410 connects the alternate communication device 235 to the alternate communication path 205, providing a back-up path for communications between the customer premises 240 and the management device 215. This communication interface may use one or more methods of WAN communication:
Cellular telephony;
Radio Access Network (RAN);
third generation (3G);
fourth generation (4G);
Long Term Evolution (LTE);
WiFi;
Super WiFi;
Whitespaces communication;
Digital Subscriber Line (DSL);
G. fast;
Passive Optical Network (PON);
Point-to-point fiber;
Cable modem;
Power line communications (PLC);
G.hn;
IEEE P1901;
HomePlug; and
Ethernet.

LAN-Side Alternate Communication Device Interface

The LAN-side alternate communication device interface 405 connects the alternate communication device 235 to the customer premises network(s) and devices. This communication interface may use one or more methods of communications:
WiFi;
Bluetooth;
Near-field communications (NFC);
Ethernet;
Twisted-pair;
Multimedia over coax (MOCA);

Home phonelines;
HomePNA;
Cellular telephony (e.g. femtocell);
Power line communications (PLC);
G.hn;
IEEE P1901;
HomePlug;
Infrared;
Optical fiber.

Alternate Communication Path:

The alternate communication device 235 can use various physical connections to connect the devices in the customer premises 240 to the Internet and the management device. On the customer premises side (modem, gateway, router, WiFi AP, femtocell, CE device), the alternate communication device can connect over WiFi, Bluetooth, Near-field communications (NFC), USB, Ethernet, powerline, or other LAN interface. On the network side (Internet, management device) the alternate communication device can connect over the RAN or any broadband connection other than the CPE's broadband connection 230 or via exploiting opportunistically WiFi connections, including a nearby or neighbor's WiFi bridged to a working broadband connection or a smartphone hotspot.

Additionally the alternate communication path can be used even when the primary communication path 225 is available, in embodiments of the invention. Such a use may be valuable in cases when the broadband connection 230 is first being installed in the customer premises 240, and even when the broadband connection is initially established if the ordinary management techniques and methods used in management of the broadband connection may not yet be fully established by the broadband network operator.

Other embodiments are envisioned where the alternate communication path to the management device is established by:
- The broadband CPE, Residential Gateway (RG), broadband modem, or CPE being equipped with a cellular module that allows sending and receiving data from them directly over the RAN;
- the RG or CPE, when they are equipped with a WiFi module that allows connecting to another CPE or RG in a neighboring customer premises with an active broadband connection;
- redundant wired connections, if they are connected and available, such as a second broadband connection;
- a relay, using more than one successive connection. An example of this is connecting to an alternate WiFi access point (AP), which then connects over an alternate broadband connection.

Once an alternate communication path 235 is available, diagnostic data and configuration commands can be exchanged between the customer premises 240 and the management device 215 for automatic troubleshooting and optimization of the faulty broadband access connection 230. This can be very useful when devices in the customer premises like the CPE 210 or the RG are equipped with measurement or diagnostics capabilities (e.g. SELT, noise conditioning and cancellation, etc.) that are not present on the operator's side 220 so that additional diagnostic data can be made available to the management device.

The capability of exchanging diagnostic and configuration data between the customer premises and the management device (either via the primary communication path 225 or the alternate communication path 235) can also include an expert system or a person providing feedback to the customer in the customer premises 240 such as guidance to perform certain tasks that can help in the resolution of the broadband connection problem.

Management Device:

The management device 215 collects data, performs analyses, and provides outputs. The management device is a function that can be located in a management center, operations support system (OSS), element management system (EMS), network management system (NMS), server, server farm, or in the cloud. The management device contains or accesses computing resources and data storage (permanent or otherwise) appropriate for performing its functions.

The management device 215 may be centralized or distributed in different embodiments. The management device may use computing resources and data storage located in the customer premises, in the network, or remotely located, or a combination of all of the above. The management device can also interface with other management systems to also input data on the configuration, system settings, historical performance, customer service data, loop (broadband connection) data, and other data. The management device can further interface with other management systems to also output analyses results, re-configurations, guidance, and trouble tickets.

Aspects of the management device, and pre- and post-processing of configuration and diagnostics data exchanged between the CPE and the management device via the alternate communications device, may be resident in the alternate communication device, according to embodiments of the invention, such as performing some of the data distillation, analyses, automated diagnosis, and some output such as reconfiguration of the CPE or providing guidance to the user.

Data

Current diagnostics and configuration data is delivered from the customer premises end 240 or the broadband connection 230 to the management device 215 over the alternate communication path 235. Historical diagnostics and configuration data can also be stored in a long-term store, for example, a nonvolatile memory store, also sometimes referred to as a permanent memory store, located in or near or accessible to the alternate communication device or management device and used for analysis.

Diagnostics and configuration data can also be used from other systems having information about the broadband service, such as DSL management systems, broadband management systems, WiFi management systems, an inventory system, a performance system, fault systems, loop (broadband connection) databases, and customer information.

Diagnostics and configuration data can encompass test, diagnostics, status, performance, monitoring, inventory, configuration, and customer subscription data. Data about the customer premises network or LAN can also be used to diagnose, repair or improve its performance, including data on LAN connections, premises wiring, wireless data such as interference and traffic per WiFi channel. Data concerning the status of the CPE 210 can also be used, including status, alarms, configuration, and capabilities. This data includes error conditions on the CPE such as modems and gateways terminating the broadband connections.

Test modes and processes can be invoked on the CPE 210 by the management device application or alternate communication device application. Data for configuring these tests, and data gleaned from these, can also be used.

Diagnostic and configuration information may include, for example;

configuration parameters and settings, including for example transmission layer, layer 2, and IP-layer parameters and settings;

performance monitoring parameters, including for example: Signal power, Signal to noise ratio (SNR) margin, noise statistics, per carrier data, error counters, byte counters, packet counters, trace-buffer diagnostics, CPE log files;

test data, including for example: equipment status, self-test, failure indications, defects, loss-of-power indicators;

Single-Ended Line Test (SELT) data;

diagnostics data, such as on-demand Double-Ended Line Test (DELT) data;

service-level agreement (SLA) data, data on service level, quality of service (QoS) data;

premises network configuration and performance data, including for example: TR-69 data, data from CPE or PC software agents or applications;

or application specific data, including for example: data on Voice over Internet (VoIP), IPTV data, web surfing data, email data.

Analytics:

Analytics are performed by the management device 215, and may also be performed by the alternate communication device 235. Analytics computation may be assisted by other available computing resources, in the customer premises or in the cloud, according to embodiments of the invention.

Analyses can be fully automated or partially automated under the control of a technician. Fully automated analyses automatically input data and provide analyses results. The analyses can determine the status, health and performance of networks and devices, customer premises LANs, broadband connection(s), WiFi, etc. Analyses can automatically identify likely root cause(s) such as equipment faults, network faults, and mis-configurations. Analyses can determine or recommend what new configuration to use. When troubleshooting broadband connection issues, the analytics can provide real-time diagnostics to support a customer or technician in the customer premises.

Analyses performed by the management device can simply identify failure conditions and misconfigurations, such as performance data below a threshold identifying a fault. Misconfigurations can be determined by comparing current settings to a list of known good configurations. Analyses may be more complex, including for example: identifying missing microfilters or poor coaxial cable splitters by signature detection, analyzing time-domain reflectometry (TDR) or frequency-domain reflectometry (FDR) data to estimate cable faults and locations, analyzing CPE log files to determine common causes of previous disconnections.

Output:

The management device 215 and the alternate communication device 235 can simply output the collection of raw diagnostics and configuration data, according to one embodiment, or can present this data in a format that is organized, distilled, or digested, according to another embodiment. Such distilled data can be presented as a dashboard, indicating links or devices that have faults or poor performance.

The output can be the results of analytics results, indicating root causes and mis-configurations, and suggestions or instructions for remediation. The output can automatically implement repairs or improve broadband performance with no manual intervention, by automatically re-configuring equipment, networks, and systems. This can be done by communicating with the CPE 210 over the alternate communication path 205, for example, to instantiate and control noise cancellation or nose reduction techniques on the broadband modem, gateway, or CPE 210.

In one embodiment, the output includes new diagnostics information with automated configuration messages to be relayed by the alternate communication device application 415 to the CPE 210, which automatically reconfigures the customer premises network to remediate problems with the CPE 210 or premises network. An example is to automatically select and change the WiFi channel to one with less interference.

New diagnostics information provided from the management device may be used at the broadband CPE, for example, by performing any one or more of the following:

reboot the CPE;

reset layer 1 configuration, including for example: set to auto-mode, or to G.adsl, to G.vdsl, change retransmission or error correction settings, change from DOCSIS 2 to 3 or vice-versa, etc.);

reset layer 2 configuration, including for example: to change ATM VCI/VPI, change Ethernet VLANs;

reset IP-layer configuration, including for example: to change to DHCP or static IP;

reset login credentials;

run connectivity tests at layer 1, 2, 3;

run speed tests between various points in the customer premises and various points in the network;

automatically perform Single-Ended Line Test (SELT) and send results to the management device;

reconfigure the home network, including for example: to change the WiFi band, channel, mode, credentials, etc;

or reconfigure CPE, including for example to support services or connections with other devices.

Automated re-configuration with the new diagnostics information can also involve the broadband network equipment and systems, and can re-configure the broadband connection and network equipment over the primary communication path 225 from the management device 215 to the network end 220 of the broadband connection 230. The network re-configuration can also involve related network systems such as network gateways or management systems. One embodiment of the invention automatically re-configures devices, channel and link parameters at the phy-layer, layer 2, or higher layers.

The new diagnostics information output can provide guidance to a user at the customer's premises end 240 in the form of prompts, questions, and tasks to be executed. The output can provide case-by-case instruction and guidance to the user, which is tailored to repairing or improving the particular line or customer premises network. The output can instruct the alternate communication device 235 to automatically display messages (e.g., on a computer, a mobile phone, a tablet, the TV, etc.) to instruct the user at the customer premises to perform actions or provide additional data about the situation.

Guidance or instructions for configuring at the broadband CPE or customer premises may, for example, include instructing the customer or on-site technician to do any one or more of:

install microfilters;

reconfigure inside wire, including for example: remove branch wiring, replace splitters;

re-install connectors;

clean connections;

install a splitter and inside wire;

recharge or replace a battery;

install or change Analog Telephone Adapters (ATA);

manually reconfigure CPE;

or replace CPE.

The data collection, analyses, and output can successively iterate in a feedback loop, collecting data and changing configuration multiple times, sometimes known as "re-profiling." Re-profiling can operate on the broadband connection 230, or on the premises network, or both.

In one embodiment, the output from the management device include inputs to other systems, for example, but not limited to, a trouble reporting system (trouble ticket system'), work-force management system, statistical analysis systems, monitoring system, or to systems that provide data to agents for manual intervention. The output can include alarms indicating faults, disconnections, poor performance, or monitoring anomalies.

In one embodiment, the output can be automatic trouble ticket generation or instructions to other systems to automatically generate trouble tickets that can output trouble tickets to the correct area; such as to dispatch inside, outside, customer premises, CPE or PC configuration, or application.

One embodiment of the invention is an apparatus, comprising an alternate communications device coupled to a broadband customer premises equipment (CPE), the gateway coupled to a broadband connection, the broadband connection coupled to a broadband communication network management device via a primary communication path, the alternate communications device further coupled to the broadband communication network management device via an alternate communication path, the alternate communications device to provide diagnostic and configuration information about the broadband connection to the broadband communication network management device via the alternate communication path, on which information the broadband communication network management device is to perform analysis; and the alternate communications device to receive from the broadband communication network management device, via the alternate communication path, new configuration information or diagnostics information about the broadband connection responsive to the broadband communication network management device performing the analysis.

In one embodiment, the alternate communications device is to provide the diagnostic and configuration information about the broadband connection to the broadband connection management device via the alternate communication path when the gateway is unable to provide the diagnostic and configuration information about the broadband connection to the broadband communication network management device via the broadband connection, for example, when the gateway is unable to provide the diagnostic and configuration information about the broadband connection to the broadband communication network management device via the broadband connection in the event of one or more of: a physical break in a cable over which the broadband connection communicates, an electrical impairment in the broadband connection, a malfunctioning gateway or transmission unit, and a mis-configured or un-configured gateway.

In one embodiment, the alternate communications device further provides diagnostic and configuration information about one or more of: the gateway to the broadband communication network management device, broadband network elements, CPE network, and CPE devices, via the alternate communication path. Correspondingly, the alternate communications device further receives from the broadband communication network management device, via the alternate communication path, instructions for configuring one or more of the gateway, broadband network elements, the CPE network, and the CPE devices, responsive to the broadband communication network management device performing analysis on the diagnostic and configuration information about the gateway.

In one embodiment, the alternate communications device provides the new configuration information about the broadband communications network to the gateway.

In one embodiment, the broadband communication network management device is to perform analysis on, in addition to the diagnostic and configuration information about the broadband connection, one or more of: historical data regarding the broadband connection maintained in a permanent store accessible to the broadband communication network management device, and data from related, neighboring, or connected, broadband connections; and the alternate communications device is to receive from the broadband communication network management device, via the alternate communication path, new configuration information about the broadband connection responsive to the broadband communication network management device performing the analysis on the diagnostic and configuration information about the broadband connection and one or more of: the historical data regarding the broadband connection, and the data from related, neighboring, or connected, broadband connections.

According to one embodiment, the broadband communication network management device, in performing the analysis, first distills the diagnostic and configuration information about the broadband connection, historical data regarding the broadband connection, and the data from related, neighboring, or connected, broadband connections, and then performs the analysis on the distilled diagnostic and configuration information, historical data, and related, neighboring, and connected broadband connections data.

In one embodiment, the alternate communications path includes a cellular radio access network (RAN). The RAN may be a cellular telephony network, or a cellular data network.

In another embodiment, the alternate communications path includes a wide area network (WAN) that may be accessed via a wireless local area network (WLAN) operating according to a standard specification for implementing WLAN computer communication in one or more selected frequency bands, for example, a Wi-Fi network, also spelled Wifi or WiFi, which is a popular technology that allows an electronic device to exchange data or connect to the internet wirelessly using radio waves based on the Institute of Electrical and Electronics Engineers' (IEEE) 802.11 standards. In one embodiment, the Wi-Fi network may be a nearby, or neighbor's Wi-Fi network, within range of the premises network.

According to one embodiment, the alternate communications device comprises a WLAN communication interface via which to communicate with the broadband communications network management device over the alternate communications path, and a local area network (LAN) communications interface via which to communicate with the gateway. Further, the alternate communications device may include one or more of an application software module, agent, or firmware, to initiate and manage the alternate communications device to couple to the broadband communication network management device via the alternate communication path, provide the diagnostic and configuration information about the broadband connection to the broadband communication network management device via the alternate communication path, and receive the new configuration information about the broadband connection.

CONCLUSION

In this description, numerous details have been set forth to provide a more thorough explanation of embodiments of the present invention. It should be apparent, however, to one skilled in the art, that embodiments of the present invention may be practiced without these specific details. In other instances, well-known structures and devices have been shown in block diagram form, rather than in detail, in order to avoid obscuring embodiments of the present invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems appears from the description herein. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

What is claimed is:

1. An apparatus, comprising:
an alternate communications device coupled to a broadband customer premises equipment (CPE), the broadband CPE coupled to a broadband communication network management device via a primary communication path,
the alternate communications device further coupled to the broadband communication network management device via an alternate communication path,
the alternate communications device to provide diagnostic and configuration information about a broadband connection to the broadband communication network management device via the alternate communication path, on which information the broadband communication network management device is to perform analysis, when the broadband CPE is unable to provide the diagnostic and configuration information about the broadband connection to the broadband communication network management device via the broadband connection; and
the alternate communications device to receive from the broadband communication network management device, via the alternate communication path, new diagnostic information for use at the broadband CPE to fix a fault or improve performance of the broadband connection or new configuration information about the broadband connection, responsive to the broadband communication network management device performing the analysis.

2. The apparatus of claim 1, wherein the broadband CPE is unable to provide the diagnostic and configuration information about the broadband connection to the broadband communication network management device via the broadband connection in the event of one or more of: a physical break in a cable over which the broadband connection communicates, an electrical impairment in the broadband connection, a malfunctioning broadband CPE or transmission unit, and a misconfigured or un-configured broadband CPE.

3. The apparatus of claim 1, wherein the alternate communications device further provides diagnostic and configuration information about one or more of: the broadband CPE, broadband network elements, a premises network, and other CPE devices, via the alternate communication path.

4. The apparatus of claim 3, wherein the alternate communications device further receives from the broadband communication network management device, via the alternate communication path, instructions for configuring one or more of the broadband CPE, a gateway, a modem, the broadband network elements, the premises network, a WiFi device or network, and the other CPE devices, responsive to the broadband communication network management device performing analysis on the diagnostic and configuration information about the one or more of: the broadband CPE, broadband network elements, the premises network, and the other CPE devices.

5. The apparatus of claim 1, wherein the alternate communications device provides the new diagnostic information or new configuration information about the broadband connection to the broadband CPE.

6. The apparatus of claim 1, wherein the broadband communication network management device is to perform analysis on, in addition to the diagnostic and configuration information about the broadband connection, one or more of: historical data regarding the broadband connection maintained in a permanent store accessible to the broadband communication network management device, and data from related, neighboring, or connected, broadband connections; and wherein the alternate communications device is to receive from the broadband communication network management device, via the alternate communication path, the new diagnostic information for use at the broadband CPE to fix a fault or improve performance of the broadband connection or new configuration information about the broadband connection, responsive to the broadband communication network management device performing the analysis on the diagnostic and configuration information about the broadband connection and one or more of: the historical data regarding the broadband connection, and the data from related, neighboring, or connected, broadband connections.

7. The apparatus of claim 6, wherein the alternate communications device performs analysis and distills the diagnostic and configuration information about the broadband connection, historical data regarding the broadband connection, and the data from related, neighboring, or connected, broadband connections, and performs the analysis on the distilled diagnostic and configuration information, historical data, and related, neighboring, and connected broadband connections data.

8. The apparatus of claim 1, wherein the alternate communications path comprises a wide area network (WAN) operating according to a standard specification for implementing WAN communication.

9. The apparatus of claim 8, wherein the alternate communications device comprises:
a WAN communication interface via which to communicate with the broadband communications network management device over the alternate communications path; and
a local area network (LAN) communications interface via which to communicate with the broadband CPE.

10. The apparatus of claim 9, wherein the alternate communications device further comprises an agent, embodied in one or more of an application software module, agent, or firmware, to initiate the alternate communications device to couple to the broadband communication network management device via the alternate communication path, provide the diagnostic and configuration information about the broadband connection to the broadband communication network management device via the alternate communication path, and receive the new diagnostic information or the new configuration information about the broadband connection.

11. The apparatus of claim 1, wherein a smartphone comprises the alternate communications device.

12. In an alternate communications device coupled to a broadband customer premises equipment (CPE), the broadband CPE coupled to a broadband connection, the broadband CPE coupled to a broadband communication network management device via a primary communication path, the alternate communications device further coupled to the broadband communication network management device via an alternate communication path, a method comprising:

providing from the alternate communications device diagnostic and configuration information about the broadband connection to the broadband communication network management device via the alternate communication path, on which information the broadband communication network management device is to perform analysis, when the broadband CPE is unable to provide the diagnostic and configuration information about the broadband connection to the broadband communication network management device via the broadband connection; and receiving at the alternate communications device, from the broadband communication network management device, via the alternate communication path, new diagnostic information for use at the broadband CPE to fix a fault or improve performance of the broadband connection or configuration information about the broadband connection, responsive to the broadband communication network management device performing the analysis.

13. The method of claim 12, wherein the broadband CPE is unable to provide the diagnostic and configuration information about the broadband connection to the broadband communication network management device via the broadband connection in the event of one or more of: a physical break in a cable over which the broadband connection communicates, an electrical impairment in the broadband connection, a malfunctioning broadband CPE or transmission unit, and a misconfigured or un-configured broadband CPE.

14. The method of claim 12, wherein the alternate communications device is further providing diagnostic and configuration information about one or more of: the broadband CPE, a gateway, a modem, the broadband connection, broadband network elements, a premises network, and other CPE devices, via the alternate communication path.

15. The method of claim 12, wherein the alternate communications device is further receiving from the broadband communication network management device, via the alternate communication path, instructions for configuring one or more of the broadband CPE, the gateway, the modem, the broadband connection, the broadband network elements, the premises network, and the other CPE devices, responsive to the broadband communication network management device performing analysis on the diagnostic and configuration information about the one or more of: the broadband CPE, the gateway, the modem, the broadband connection, the broadband network elements, the premises network, and the other CPE devices.

16. The method of claim 12, wherein the alternate communications device is providing the new diagnostic and the new configuration information about the broadband connection to the broadband CPE or to a broadband CPE user.

17. The method of claim 12, wherein the broadband communication network management device is performing analysis on, in addition to the diagnostic and configuration information about the broadband connection, one or more of: historical data regarding the broadband connection maintained in a permanent store accessible to the broadband communication network management device, and data from related, neighboring, or connected, broadband connections; and wherein the alternate communications device is receiving from the broadband communication network management device, via the alternate communication path, the diagnostic information for use at the broadband CPE to fix a fault or improve performance of the broadband connection or the new configuration information about the broadband connection, responsive to the broadband communication network management device performing the analysis on the diagnostic and configuration information about the broadband connection and one or more of: the historical data regarding the broadband connection, and the data from related, neighboring, or connected, broadband connections.

18. The method of claim 17, wherein the alternate communications device performing analysis and distilling the diagnostic and configuration information about the broadband connection, historical data regarding the broadband connection, and the data from related, neighboring, or connected, broadband connections, and performing the analysis on one or more of the distilled diagnostic and configuration information, historical data, and related, neighboring, and connected broadband connections data.

19. The method of claim 12, wherein the alternate communications path is operating as a Wide area network (WAN) according to a standard specification for implementing WAN computer communication.

20. The method of claim 19, wherein the alternate communications is communicating with the broadband communications network management device over the alternate communications path via a WAN communication interface, and is communicating with the broadband CPE via a local area network (LAN) communications interface.

21. The method of claim 20, wherein the alternate communications device further is executing an agent, embodied in one or more of an application software module, agent, or firmware, to initiate the alternate communications device to couple to the broadband communication network management device via the alternate communication path, provide the diagnostic and configuration information about the broadband connection to the broadband communication network management device via the alternate communication path, and receive the new diagnostic and the new configuration information about the broadband connection.

22. A computer-readable, non-transitory, storage medium, comprising computer instructions, that when executed, cause an alternate communications device coupled to a broadband customer premises equipment (CPE), to perform a method, comprising:

providing from the alternate communications device diagnostic and configuration information about a broadband connection, to which the broadband CPE is coupled, to a broadband communication network management device, to which the alternate communication device is coupled via an alternate communication path, on which information the broadband communication network management device is to perform analysis, when the broadband CPE is unable to provide the diagnostic and configuration information about the broadband connection to the broadband communication network management device via a primary communication path; and receiving at the alternate communications device, from the broadband communication network management device, via the alternate communication path, new diagnostic information for use at the broadband CPE to fix a fault or improve performance of the broadband connection or configuration information about the broadband connection, responsive to the broadband communication network management device performing the analysis.

23. The computer readable medium of claim 22, wherein the computer instructions, when executed, cause the alternate communications device, to further perform a method, comprising:

providing further diagnostic and configuration information from alternate communications device about one or more of: the broadband CPE, a gateway, a modem, the broadband connection, broadband network elements, a premises network, and other CPE devices, via the alternate communication path.

24. The computer readable medium of claim 22, wherein the computer instructions, when executed, cause the alternate communications device, to further perform a method, comprising:

further receiving at the alternate communications device, from the broadband communication network management device, via the alternate communication path, instructions for configuring one or more of the broadband CPE, the gateway, the modem, the broadband connection, the broadband network elements, the premises network, and the other CPE devices, responsive to the broadband communication network management device performing analysis on the diagnostic and configuration information about the one or more of: the broadband CPE, the gateway, the modem, the broadband connection, the broadband network elements, the premises network, and the other CPE devices.

25. The computer readable medium of claim 22, wherein the broadband communication network management device is performing analysis on, in addition to the diagnostic and configuration information about the broadband connection, one or more of: historical data regarding the broadband connection maintained in a permanent store accessible to the broadband communication network management device, and data from related, neighboring, or connected, broadband connections; and wherein the computer instructions, when executed, cause the alternate communications device, to further perform a method, comprising receiving from the broadband communication network management device, via the alternate communication path, the diagnostic information for use at the broadband CPE to fix a fault or improve performance of the broadband connection or the new configuration information about the broadband connection, responsive to the broadband communication network management device performing the analysis on the diagnostic and configuration information about the broadband connection and one or more of: the historical data regarding the broadband connection, and the data from related, neighboring, or connected, broadband connections.

26. The computer readable medium of claim 22, wherein the computer instructions, when executed, cause the alternate communications device, to further perform a method, comprising analyzing and distilling the diagnostic and configuration information about the broadband connection, historical data regarding the broadband connection, and the data from related, neighboring, or connected, broadband connections, and performing the analysis on one or more of the distilled diagnostic and configuration information, historical data, and related, neighboring, and connected broadband connections data.

* * * * *